United States Patent
Foley et al.

(10) Patent No.: US 10,174,163 B2
(45) Date of Patent: Jan. 8, 2019

(54) NON-AQUEOUS CROSSLINKABLE COMPOSITION A METHOD TO PRODUCE SAME AND COATINGS AND ARTICLES COMPRISING THE SAME

(71) Applicant: Dow Global Technologies LLC, Midland, MI (US)

(72) Inventors: Paul Foley, Traverse City, MI (US); John N. Argyropoulos, Midland, MI (US); Yiyong He, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 90 days.

(21) Appl. No.: 15/035,234

(22) PCT Filed: Oct. 14, 2014

(86) PCT No.: PCT/US2014/060364
§ 371 (c)(1),
(2) Date: May 8, 2016

(87) PCT Pub. No.: WO2015/073151
PCT Pub. Date: May 21, 2015

(65) Prior Publication Data
US 2016/0289385 A1   Oct. 6, 2016

Related U.S. Application Data

(60) Provisional application No. 61/903,494, filed on Nov. 13, 2013.

(51) Int. Cl.
| | |
|---|---|
| *C08G 71/02* | (2006.01) |
| *C08G 12/46* | (2006.01) |
| *C08G 65/333* | (2006.01) |
| *C09D 161/24* | (2006.01) |
| *C09D 175/02* | (2006.01) |

(52) U.S. Cl.
CPC ............. *C08G 71/02* (2013.01); *C08G 12/46* (2013.01); *C08G 65/333* (2013.01); *C08G 65/33303* (2013.01); *C08G 65/33396* (2013.01); *C09D 161/24* (2013.01); *C09D 175/02* (2013.01); *C08G 2650/50* (2013.01)

(58) Field of Classification Search
CPC ...... C08G 12/02; C08G 65/333; C08G 12/49; C08G 71/02; C09D 161/24; C09D 161/22
USPC ....................................................... 524/612
See application file for complete search history.

(56) References Cited

U.S. PATENT DOCUMENTS

| | | |
|---|---|---|
| 2,400,916 A | 5/1946 | Myer |
| 4,129,716 A | 12/1978 | Schulze |
| 4,160,754 A | 7/1979 | Schapel et al. |
| 4,243,797 A | 1/1981 | Petersen et al. |
| 4,855,394 A | 8/1989 | Goeckel et al. |
| 4,906,727 A | 3/1990 | Fischer et al. |
| 5,530,031 A | 6/1996 | Guenther et al. |
| 8,460,758 B2 | 6/2013 | Flood et al. |
| 8,889,818 B2 | 11/2014 | Argyropoulous et al. |
| 2009/0253858 A1* | 10/2009 | Argyropoulos .... C08G 18/0823 524/591 |
| 2011/0313091 A1 | 12/2011 | Argyropoulos et al. |
| 2013/0165581 A1* | 6/2013 | Argyropoulos ......... C08F 22/10 524/560 |
| 2014/0369850 A1* | 12/2014 | Popa ....................... C08G 12/46 416/241 A |
| 2014/0371388 A1* | 12/2014 | Spilman ............... C09D 179/00 524/602 |
| 2015/0197665 A1* | 7/2015 | Hsieh ................... C09D 175/04 427/458 |
| 2016/0130472 A1* | 5/2016 | Popa ....................... C08G 12/46 428/339 |
| 2016/0145466 A1* | 5/2016 | Spilman ............... C09D 175/12 524/600 |

OTHER PUBLICATIONS

Chinese Office Action dated Apr. 25, 2017; from Chinese counterpart Application No. 201480058887.8.
EP Office Action dated Jun. 21, 2016; from EP counterpart Application No. 14789730.0.
PCT Search Report dated Apr. 29, 2015; from PCT counterpart Application No. PCT/US2014/60364.
PCT IPRP dated May 17, 2016; from PCT counterpart Application No. PCT/US2014/60364.
Chinese Office Action dated Feb. 1, 2018; from Chinese counterpart Application No. 201480058887.8.
Japanese Office Action dated May 27, 2018; from Japanese counterpart Application No. 2016-525988.
EP Office Action dated Jan. 22, 2018; from EP counterpart Application No. 14789730.0.
Japanese Office Action dated Oct. 29, 2018; from Japanese counterpart Application No. 2016-525988.

* cited by examiner

*Primary Examiner* — Jane L Stanley

(57) ABSTRACT

A non-aqueous crosslinkable composition comprising a polyurea having a functionality of equal to or greater than 2; an aldehyde or acetal or hemiacetal thereof; and optionally one or more organic solvents is provided. Further provided is a crosslinked composition, a coating, articles including the coating and a method of making a non-aqueous crosslinkable composition.

14 Claims, No Drawings

NON-AQUEOUS CROSSLINKABLE COMPOSITION A METHOD TO PRODUCE SAME AND COATINGS AND ARTICLES COMPRISING THE SAME

FIELD OF INVENTION

The instant invention relates to a non-aqueous crosslinkable composition, a crosslinked composition, a coating composition, articles comprising the coating composition and method for making a non-aqueous crosslinkable composition.

BACKGROUND OF THE INVENTION

Low molecular weight polymers (e.g., having molecular weights of 200 to 2,000 daltons) containing amine-functionality (also referred to as polyamines) are utilized in coating applications and are cured at room temperature using polyisocyanates to provide crosslinked polyureas. Such formulations cure very fast at ambient conditions and provide coatings with superior properties but have short pot-life. Further, such formulations are toxic and generally are expensive.

SUMMARY OF THE INVENTION

The instant invention is a non-aqueous crosslinkable composition, a crosslinked composition, a coating composition, articles comprising the coating composition and method for making a non-aqueous crosslinkable composition.

In one embodiment, the instant invention provides a non-aqueous crosslinkable composition comprising: a polyurea having a functionality of equal to or greater than 2; an aldehyde or acetal or hemiacetal thereof; and optionally one or more organic solvents.

DETAILED DESCRIPTION OF THE INVENTION

The instant invention is a non-aqueous crosslinkable composition, a crosslinked composition, a coating composition, articles comprising the coating composition and method for making a non-aqueous crosslinkable composition.

As used herein, the term "non-aqueous crosslinkable composition" means a crosslinkable composition in which the polymer is not dispersed in a continuous aqueous phase.

The non-aqueous crosslinkable composition according to the present invention comprises a polyurea having a functionality of equal to or greater than 2; an aldehyde or acetal or hemiacetal thereof; and optionally one or more organic solvents.

In an alternative embodiment, the instant invention further provides a crosslinked composition produced by crosslinking the non-aqueous crosslinkable composition according to any embodiment disclosed herein.

In another alternative embodiment, the instant invention further provides a coating composition comprising a crosslinked composition according to any embodiment disclosed herein.

In yet another alternative embodiment, the instant invention further provides an article comprising a substrate and a coating composition, according to any embodiment disclosed herein, coated onto at least one surface of the substrate.

In another embodiment, the instant invention further provides a method for making a non-aqueous crosslinkable composition comprising selecting a polyurea having a functionality of at least 2; selecting an aldehyde or acetal or hemiacetal thereof; and optionally selecting at least one or more solvents; admixing the foregoing components, thereby producing said crosslinkable composition.

Any polyurea having a functionality of equal to or greater than 2 may be used in embodiments of the invention, as illustrated below;

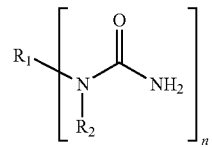

where $R_1$ is a group containing equal to or greater than 2 carbon atoms; $R_2$ is H or a group containing equal to or greater than 2 carbon atoms and n is equal to or greater than 2. In an alternative embodiment, $R_1$ and $R_2$ contain from 2 to 500 carbon atoms. $R_1$ and $R_2$ may contain the same or different number of carbon atoms. All individual values from 2 to 500 carbon atoms are disclosed herein and included herein. For example, in alternative embodiments, the number of carbon atoms in $R_1$ and $R_2$ may range from a lower limit of 2, 75, 150, 225, 300, 375, or 425 to an upper limit of 50, 125, 200, 275, 325, 400, 475 or 500. For example, the number of carbon atoms in $R_1$ and $R_2$ may be from 2 to 500, or in the alternative, from 2 to 250, or in the alternative, from 250 to 500, or in the alternative, from 100 to 400.

The polyurea can be prepared by any method, such as the reaction of a polyamine with urea or an alkyl carbamate (such as methyl carbamate). A multitude of functional groups can be present in the $R_1$ group of the polyurea, including, but not limited to, ester, olefin, hydroxyl, amide, ether groups or a combination of any two or more thereof. As one example, the polyurea can be prepared from the reaction of a polyether amine with urea. An example of a suitable polyether amine is a polyoxypropylene triamine, as illustrated below, wherein A represents the nucleus of an oxyalkylation susceptible trihydric alcohol containing from about 3 to 6 carbon atoms and the sum of x+y+z is from about 4 to about 100.

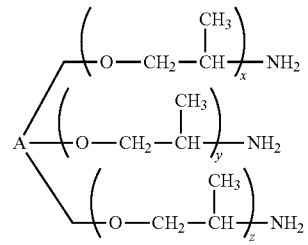

In general, the average molecular weight of the polyoxypropylene triamine shown above will be from about 200 to about 5000. An example of such a product is a commercial product (JEFFAMINE™ T-403) having an average molecular weight of about 400, wherein A represents a trimethylol propane nucleus containing 6 carbon atoms and the sum of x+y+z is from about 5 to 6.

As a second example, the polyurea can be prepared from the reaction of a cycloaliphatic diamine (such as isophorone diamine) with urea.

In a particular embodiment, R1 is selected from the group of polymers consisting of polyolefins, poly(acrylates), polyamides, polyesters, and polyethers.

Any aldehyde, acetal or hemiacetal thereof may be used in embodiments of the crosslinkable composition. Aldehydes include mono-aldehydes and polyaldehydes. Exemplary mono-aldehydes include cyclohexanecarboxaldehyde.

As used herein, the term "polyaldehyde" means a molecule containing two or more aldehyde groups or their hydrates, or their acetals or hemiacetals, wherein the molecule is capable of performing as described herein and is capable of reacting with the polyurea during the invention curing step so as to form the invention crosslinked polyurea. The aldehyde group can be written herein as —C(=O)H or —CHO. In a particular embodiment, the aldehyde is a dialdehyde.

Preferably, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 3 to 20 ring carbon atoms.

In one embodiment, each cyclic, nonaromatic polyaldehyde in the crosslinkable composition independently has from 5 to 12 ring carbon atoms, and, even more preferably, is a mixture of (cis,trans)-1,4-cyclohexanedicarboxaldehydes and (cis,trans)-1,3-cyclohexanedicarboxaldehydes. According to the present invention, the polyaldehyde may comprise one or more acyclic, straight or branched polyaldehyde having from 2 to 16 carbon atoms. In another embodiment, each of the one or more acyclic, straight or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarboxaldehyde.

In a particular embodiment, the polyaldehyde has a solubility in water of from 0.015 to 0.20 gram of polyaldehyde per milliliter of water at 25° C., or in the alternative, up to 0.15 gram, or, preferably, 0.03 gram or more. In an alternative embodiment, the polyaldehyde has greater water solubility, such as glyoxal or glutaraldehyde. In yet another embodiment, the polyaldehyde is chosen from a $C_5$ to $C_{11}$ alicyclic or aromatic dialdehyde, or, in the alternative, a $C_6$ to $C_{10}$ alicyclic or aromatic dialdehyde, such as, for example, (cis,trans)-1,4-cyclohexanedicarboxaldehydes, (cis,trans)-1,3-cyclohexanedicarboxaldehydes and mixtures thereof.

Any acid catalyst having a $pK_a$ of less than 7 may be used in embodiments of the invention. All individual values and subranges from less than 7 are included herein and disclosed herein. For example, the acid catalyst may have a $pK_a$ of less than 7, or in the alternative, less than 6.5 or in the alternative, less than 6, or in the alternative, less than 5.5, or in the alternative, less than 5, or in the alternative, less than 4.5, or in the alternative, less than 4. Exemplary acid catalysts include p-toluenesulfonic acid (PTSA), trifluoroacetic acid, and the like.

Examples of acid catalysts are Lewis acids (e.g., boron trifluoride etherate) and protic acids (i.e., Bronsted acids). In one embodiment, the acid catalyst comprises a protic acid. In one embodiment, the acid catalyst is an inorganic protic acid such as phosphoric acid or sulfuric acid, or an organic protic acid such as carboxylic acid, phosphonic acid, or sulfonic acid. Exemplary carboxylic acids include acetic acid, trifluoroacetic acid and propionic acid. An exemplary phosphonic acid is methylphosphonic acid. Exemplary sulfonic acids include methanesulfonic acid, benzenesulfonic acid, a camphorsulfonic acid; para-toluenesulfonic acid, and dodecylbenzenesulfonic acid. Examples of suitable Lewis acid catalysts are $AlCl_3$; benzyltriethylammonium chloride (TEBAC); $Cu(O_3SCF_3)_2$; $(CH_3)_2BrS^+Br^-$; $FeCl_3$ (e.g., $FeCl_3.6H_2O$); $HBF_4$; $BF_3.O(CH_2CH_3)_2$; $TiCl_4$; $SnCl_4$; $CrCl_2$; $NiCl_2$; and $Pd(OC(O)CH_3)_2$.

The acid catalyst can be unsupported (no solid support) or supported, i.e. covalently bonded to a solid support. Examples of supported triggering agents are supported curing catalysts such as supported acid catalysts such as acid ($H^+$) forms of cation exchange-type polymer resins (e.g., ethanesulfonic acid, 2-[1-[difluoro[(1,2,2-trifluoroethenyl)oxy]methyl]-1,2,2-tetrafluoroethoxy]-1,1,2,2-tetrafluoro-, polymer with 1,1,2,2-tetrafluoroethene sold under trade name NAFION NR50 (E. I. du Pont de Nemours & Co., Inc., Wilmington, Del.) and ethenylbenzenesulfonic acid polymer with diethenylbenzene sold as AMBERLYST™ 15 (The Dow Chemical Company, Midland, Mich., USA.).

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the non-aqueous crosslinkable composition further comprises an acid catalyst having pKa of less than 7.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the non-aqueous crosslinkable composition further comprises a curing inhibitor. Curing inhibitors include one or more selected from the group consisting of water, alcohols and mixtures thereof. Alcohols useful as curing agents include, for example, alkanols having from 1 to 12 carbons. In a particular embodiment, the curing inhibitor comprises a primary alkanol.

The curing inhibitor may be used to delay onset of or increasing length of time of curing or both of the compositions until such time that curing is desirable, and can be removed from the composition (e.g., by evaporation), thereby initiating or increasing rate of curing thereof. Suitable curing inhibitors have a boiling point at atmospheric pressure of at most 300° C., or in the alternative, at most 250° C., or in the alternative, at most 200° C. In certain embodiments of the crosslinkable compositions, the curing inhibitor is present in an amount of from 0.5 wt % to 90 wt % based on the total weight of solids in the composition, or, in the alternative, at most 60 wt %, or in the alternative, at most 50 wt %. In certain embodiments of the crosslinkable composition, the curing inhibitor concentration is at least 1 wt %, based on the total weight of solids in the composition, or in the alternative, at least 2 wt %. The curing inhibitor can enable the composition to maintain, if desired, a long pot life (e.g., 14 days or longer), and then, when curing is desired, can be removed (e.g., by evaporation) from the invention composition so as to enable the curing and drying to touch of the resulting invention composition in a comparable amount of time as curing and drying to touch time of a same invention composition except lacking the curing inhibitor and enabling the resulting cured and dried coating thereof to exhibit a comparable degree of hardness as a cured and dried coating prepared from the same invention composition except lacking the curing inhibitor. In one embodiment, the curing inhibitor is one or more alkanols present at a concentration of from 0.5 wt % to 50 wt %, based on the total weight of solids in the composition, or in the alternative, at most 20 wt %, or in the alternative, at most 10 wt %. In one embodiment, the curing inhibitor is one or more alkanols present at a concentration of at least 1 wt %, based on the total weight of solids in the composition, or in the alternative at least 2 wt %. In one embodiment, the curing inhibitor is water present at a concentration of from 0.5 wt % to 40 wt %, based on the total weight of solids in the composition, or in the alternative, at most 20 wt %, or in the alternative, at most 10 wt %. In one embodiment, the curing inhibitor is water present at a concentration of from least 1 wt %, based on the total weight of solids in the composition, or in the alternative at least 2 wt %. In yet another embodiment, the curing inhibitor comprises a combination of water and alkanol.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the crosslinkable composition is capable of reacting to cure at a temperature of equal to or less than 80° C. to form a crosslinked composition. All individual values and subranges from equal to or less than 80° C. are included herein and disclosed herein. For example, the crosslinkable composition is capable of reacting to cure at a temperature of equal to or less than 80° C., or in the alternative, at a temperature of equal to or less than 60° C., or in the alternative, at a temperature of equal to or less than 40° C., or in the alternative, at a temperature of equal to or less than 20° C. In another embodiment, the crosslinkable composition is capable of reacting to cure at a temperature of equal to or greater than 0° C., or in the alternative, at a temperature of equal to or greater than 10° C., or in the alternative, at a temperature of equal to or greater than 20° C., or in the alternative, at a temperature of equal to or greater than 30° C., or in the alternative, at a temperature of equal to or greater than 40° C.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the crosslinkable composition has an aldehyde group to urea group molar ratio from 0.5:1 to 2:1. All individual values and subranges from 2:1 to 0.5:1 are included herein and disclosed herein; for example, the aldehyde group to urea group molar ratio can range from a lower limit of 0.5:1, 0.9:1, 1.3:1, or 1.7:1 to an upper limit of 0.6:1, 1:1, 1.4:1, 1.8:1 or 2:1. For example, the aldehyde group to urea group molar ratio of the crosslinkable composition can range from 0.5:1 to 2:1, or in the alternative, from 0.5:1 to 1:1, or in the alternative, from 1:1 to 2:1, or in the alternative, from 0.75:1 to 1.75:1.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the polyaldehyde is a mixture of (cis,trans)-1,4-cyclohexanedicarboxaldehydes, (cis,trans)-1,3-cyclohexanedicarboxaldehydes.

Examples of suitable organic solvents are non-polar or polar organic solvents such as, for example, an alkane (e.g., a $(C_6\text{-}C_{12})$alkane), aromatic (e.g., a $(C_6\text{-}C_{12})$aromatics), ether (e.g., $(C_2\text{-}C_{12})$ether), carboxylic ester (e.g., a $(C_2\text{-}C_{12})$ carboxylic ester), ketone (e.g., a $(C_3\text{-}C_{12})$ketone), secondary or tertiary carboxamide (e.g., a secondary or tertiary $(C_3\text{-}C_{12})$carboxamide), sulfoxide (e.g., a $(C_2\text{-}C_{12})$sulfoxide), or a mixture of two or more thereof.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the crosslinked composition further comprises one or more additives selected from the group consisting of rheology modifiers, wetting agents, leveling agents, flow additives, stabilizers, surfactants, pigments, dispersants, and waxes.

In an alternative embodiment, the instant invention provides a non-aqueous crosslinkable composition, method of producing the same, a crosslinked composition made therefrom, a coating composition comprising the crosslinked composition, and articles comprising the coating composition, in accordance with any of the preceding embodiments, except that the coating is a wood coating or a metal coating.

The crosslinked composition according to embodiments of the invention may be used for a variety of end uses, including for example, in structural components, elastomers, sealants, adhesives, films and foams.

In another embodiment, the invention provide a non-aqueous crosslinkable composition consisting essentially of a polyurea having a functionality of equal to or greater than 2; an aldehyde or acetal or hemiacetal thereof; and optionally one or more organic solvents.

In another alternative embodiment, the instant invention further provides a coating composition consisting essentially of a crosslinked composition according to any embodiment disclosed herein.

EXAMPLES

The following examples illustrate the present invention but are not intended to limit the scope of the invention.

Polyurea Preparation:

Polyurea was prepared by the reaction of a polyetheramine and urea. JEFFAMINE T-403 (commercially available from Huntsman Corporation) (Average Hydrogen Equivalent Weight=81 g/eq, total amine equivalents=6.35 meq/g) is a polyetheramine characterized by repeating oxypropylene units in the backbone. JEFFAMINE T-403 is a trifunctional primary amine having an average molecular weight of approximately 440 g/mole, with its amine groups located on secondary carbon atoms at the ends of aliphatic polyether chains. Urea having a formula weight of 60.06 g/mol was commercially obtained from Sigma-Aldrich Co. 300 g (1.905 moles $NH_2$) JEFFAMINE T-403 and 126 g (2.0955 moles, 10% excess) urea were loaded into a 3-necked 1000 mL round bottom flask equipped with a mechanical stirrer, Dean-Stark trap, condenser, heating mantle and nitrogen bubbler system. The system was flushed with nitrogen and the temperature was slowly brought to 110° C. To the heterogeneous mixture, 35 g of distilled water was added to bring the urea into solution. The reaction was run with a nitrogen flush over the reaction solution and the ammonia generated was allowed to escape through the bubbler. The reaction was kept below 110° C. The reaction was followed by an HCl titration. Initially, the as received JEFFAMINE T-403 was titrated using 0.5N HCl (in methanol) and Bromophenol Blue indicator (2 g JEFFAMINE T-403 in 75 mL of isopropanol should use about 25.4 mL of the HCl titrant). After about 8 hours, a 2 g sample was removed from the reaction flask, cooled to room temperature and a similar HCl titration was performed. The reaction was considered complete when the titration consumed <2 mL of 0.5N HCl and completion was typically in about 12 hours. This procedure was used with JEFFAMINE T403 to prepare Inventive Examples 1-9 and 15 and Comparative Example 1. The resulting JEFFAMINE T403 polyurea had an equivalent weight of 206.5 g eq/mole at 100% solids.

The foregoing procedure was also used to prepare polyureas using JEFFAMINE XTJ 542 (a diamine of approximately 1000 molecular weight with a total amine of 1.96 meq/g) and JEFFAMINE T3000 (a triamine of approximately 3000 molecular weight with a total amine of 0.94 meq/g), both of which are commercially available from Huntsman Corporation. The resulting JEFFAMINE XTJ-542 polyurea having an equivalent weight of 559.28 g eq/mole at 100% solids was used to prepare Inventive Examples 10-13 and Comparative Example 2. The resulting JEFFAMINE T3000 polyurea, having an equivalent weight of 1113.5 g eq/mole at 100% solids, was used to prepare Inventive Example 14.

The polyureas produced, as described above, were cross-linked (in the Inventive Examples) with a variety of aldehydes in the presence of an acid catalyst, p-toluenesulfonic acid (PTSA), at room temperature and pressure to produce crosslinked compositions. The aldehydes used to prepare each of the Inventive Examples are as shown in Tables 1-4. No aldehydes were used in Comparative Examples 1-2.

Preparation of Coated Wood Examples:

A Poplar board ¼ in.×4 in.×48 in. was cut into 5 inch lengths (5 in.×4 in.×¼ in.). Each board was coated three times with one of the exemplary coatings by using a foam brush. After each coat, the coating was allowed to dry for 1 day and then lightly sanded before the addition of the next coat. The last coat, the third coat, was not sanded. After 7 days from the final coating applied, stain resistance tests were performed.

Table 1 summarizes the coating properties for JEFFAMINE T403 Polyurea crosslinked using cyclohexanedicarboxaldehyde (CHDA) with various molar ratios of CHO functional group to urea group, Inventive Examples 1-3. Table 1 illustrates a significant increase in coating properties of Inventive Examples 1-3 as compared to Comparative Example 1, having the same formulation as Inventive Examples 1-3 except that Comparative Example 1 was not crosslinked with CHDA. A pendulum hardness of near 100 and a pencil hardness of 2H was measured at the higher dialdehyde crosslinker ratios. The MEK double rub and gel fraction performance measured clearly indicate crosslinking as compared to the control without dialdehyde.

Other commercial dialdehydes, glyoxal and glutaraldehyde, were used to crosslink polyurea made from JEFFAMINE T403, as shown in Table 2, Inventive Examples 4-9. Table 2 illustrates crosslinked compositions at a variety of CHO to urea molar ratios, as well as Comparative Example 1. The coating properties obtained using glyoxal or glutaraldehyde were significantly lower as compared to those of Inventive Examples 1-3.

Inventive Examples 10-13 in Table 3 illustrates the results of crosslinking di-functional JEFFAMINE Polyurea, JEFFAMINE XTJ 542, with CHDA, at a variety of CHO to urea group molar ratios.

Table 4 illustrates the film properties of Inventive Examples 14-15. Inventive Example 14 was prepared using JEFFAMINE T3000 polyurea crosslinked with CHDA. Inventive Example 15 was prepared using JEFFAMINE T403 polyurea and crosslinked with a mono-aldehyde, specifically cyclohexanecarboxaldehyde.

TEST METHODS

Test methods include the following:

Solids (weight %): determined by thermogravimetric analysis (TGA) by placing 10 mg of sample into a standard thermogravimetric analysis unit that has a nitrogen gas purge. Heat the sample from 25° C. to 300° C. at a heating rate of 10° C. per minute (° C./min). From a graph of % weight loss as a function of time curve, use break in slope of the curve where the weight loss levels out as the percent (fraction of) solids.

Thickness of the coating: ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

Gloss: measurements are made with a BYK Labotron Gloss Unit following ASTM D523-08 (Standard Test Method for Specular Gloss (2008)).

Impact resistance: is determined by using a Gardner impact tester and following ASTM D2794-93 (Standard Test Method for Resistance of Organic Coatings to the Effects of Rapid Deformation (Impact) (1993)).

Pendulum hardness: according to the Konig pendulum hardness test by following ANSI ISO1522 (Pendulum damping test).

Pencil hardness: ASTM D3363-05 (Standard Test Method for Film Hardness by Pencil Test (2005)).

MEK resistance: Reported as the number of methyl ethyl ketone (MEK) rubs that are required to remove enough of the coating down to and thereby exposing the surface of the substrate.

Cross-hatch adhesion: ASTM D3359-09 (Standard Test Methods for Measuring Adhesion by Tape Test) (scale 0B to 5B with 5B being the best adhesion).

Stain resistance (of a coating): determined by placing drops of the insult material (water, 50% ethanol/water, skydrol, and Windex) onto a piece of absorbent paper that is in direct contact with the coating surface, covering the thoroughly wetted paper with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. A relative rating from 1 to 6 was assigned, with 1 being the most severe damage and 6 being lowest with no affect to the coating, characterized as follows:

1=Cut through, dissolves coating, cracks/peels away.
2=Water corrodes substrate.
3=Severe blushing, forms bubbles/wrinkles.
4=Mild blushing/yellowing, no change to touch.
5=No effect, visible or otherwise.
6=No effect, never even blushed.

Gel Fraction (of the coating material): Reported as the percent of a film sample that remains after 24 hours of exposing a polymer film in a Soxhlet extractor with refluxing acetone. A film sample is prepared using the same formulation as the coating and is poured into an aluminum foil boat to make a dried coating thickness of ~0.1 mm. The cured film is pealed from the foil and ~1 g of film is placed into a Soxhlet extractor thimble and an accurate weight is recorded. The thimble/film sample is paced into a Soxhlet extractor using acetone as the refluxing solvent. The sample is extracted for 24 hours using the refluxing acetone. The thimble/film sample is removed, allowed to dry overnight and weighed. The percent of material remaining after the extraction is calculated.

The present invention may be embodied in other forms without departing from the spirit and the essential attributes thereof, and, accordingly, reference should be made to the appended claims, rather than to the foregoing specification, as indicating the scope of the invention.

TABLES

TABLE 1

|  | Inv. Ex. 1 | Inv. Ex. 2 | Inv. Ex. 3 | Comp. Ex. 1 |
|---|---|---|---|---|
| Polyurea | JEFFAMINE T403 Polyurea | | | |
| Crosslinker | | CHDA | | None |
| Crosslinker quantity (CHO to urea group) | 2:1 | 1:1 | 0.5:1 | 0:1 |
| PTSA catalyst (% solids) with 1 g IPA | 1 | 1 | 1 | 1 |
| Film Thickness (mil) | 2.9 | 3.5 | 2.6 | NA |
| Pendulum Hardness (Konig, sec) | 99 | 71 | 18 | 3 |
| Pencil Hardness (gouge) | F | 2H | 2B | Fail |
| 20° Gloss (GU) | 113 | 110 | 111 | NA |
| 60° Gloss (GU) | 114 | 115 | 114 | NA |
| Cross-Hatch Adhesion | 5B | 5B | 5B | NA |
| Impact Resistance (direct, in · lbs) | 10 | <10 | 90 | NA |
| MEK Resistance (double rubs) | 250 | 263 | 25 | 10 |
| Gel Fraction (24 h, acetone) (%) | 82.1 | 92.5 | 73.0 | 7.7 |
| Stain | Wood (7 day ambient cure) | | | |
| Skydrol | 3 | 3 | 2 | NA |
| Windex | 3 | 3 | 2 | NA |
| 50% Ethanol | 3 | 3 | 1 | NA |
| Water | 1 | 3 | 1 | NA |

NA(as used in Tables): Not applicable or could not be measured

TABLE 2

|  | Inv. Ex. 4 | Inv. Ex. 5 | Inv. Ex. 6 | Inv. Ex. 7 | Inv. Ex. 8 | Inv. Ex. 9 | Comp. Ex. 1 |
|---|---|---|---|---|---|---|---|
| Polyurea | JEFFAMINE T403 Polyurea | | | | | | |
| Crosslinker | | Glyoxal | | | Glutaric Dialdehyde | | None |
| Crosslinker quantity (CHO to urea group) | 2:1 | 1:1 | 0.5:1 | 2:1 | 1:1 | 0.5:1 | 0:1 |
| PTSA catalyst (% solids) | 1 | 1 | 1 | 1 | 1 | 1 | 1 |
| Film Thickness (mil) | 2.2 | 1.8 | 1.8 | 2.3 | 2.6 | 2.1 | NA |
| Pendulum Hardness (Konig, sec) | 17 | 0 | 0 | 107 | 32 | 0 | 3 |
| Pencil Hardness (gouge) | 3B | 6B | Fail | HB | 2B | Fail | Fail |
| 20° Gloss (GU) | 107 | 102 | 107 | 111 | 108 | 107 | NA |
| 60° Gloss (GU) | 109 | 107 | 107 | 111 | 110 | 108 | NA |
| Cross-Hatch Adhesion | 3B | 4B | 4B | 5B | 4B | 4B | NA |
| Impact Resistance (direct, in · lbs) | <10 | 10 | <10 | <10 | <10 | <10 | NA |
| MEK Resistance (double rubs) | 47.5 | 25 | 20 | 125 | 30 | 15 | 10 |
| Gel Fraction (24 h, acetone) (%) | 97.9 | 72.4 | 64.3 | 85.3 | 95.2 | 62.5 | 7.7 |

TABLE 3

|  | Inv. Ex. 10 | Inv. Ex. 11 | Inv. Ex. 12 | Inv. Ex 13 | Comp. Ex. 2 |
| --- | --- | --- | --- | --- | --- |
| Polyurea | JEFFAMINE XTJ-542 | JEFFAMINE XTJ-542 | JEFFAMINE XTJ-542 | JEFFAMINE XTJ-542 | JEFFAMINE XTJ-542 |
| Crosslinker | CHDA Crude | CHDA Crude | CHDA Crude | CHDA Crude | None |
| Crosslinker quantity (CHO to urea group) | 3:1 | 2:1 | 1:1 | 0.5:1 | 0:1 |
| PTSA catalyst (% solids) with 1 g IPA | 1 | 1 | 1 | 1 | 1 |
| Film Thickness (mil) | 2.0 | 1.9 | 1.9 | 1.3 | NA |
| Pendulum Hardness (Konig, sec) | 13 | 22 | 30 | 13 | NA |
| Pencil Hardness (gouge) | 5B | 2B | Fail | Fail | Fail |
| 20° Gloss (GU) | 104 | 107 | 96 | 103 | NA |
| 60° Gloss (GU) | 110 | 110 | 109 | 109 | NA |
| Cross-Hatch Adhesion | 4B | 4B | 4B | 4B | NA |
| Impact Resistance (direct, in · lbs) | 100 | 110 | 110 | 10 | NA |
| MEK Resistance (hammer, double rubs) | 32.5 | 32.5 | 27.5 | 27.5 | 5 |
| Gel Fraction (24 h, acetone) (%) | 11.6 | 17.6 | 61.0 | 43.7 | 4.3 |
| Gel Fraction (24 h, acetone) (%)(after 4 month @ ambient |  |  | 59.2 | NA | NA |

TABLE 4

|  | Inv. Ex. 14 | Inv. Ex. 15 |
| --- | --- | --- |
| Polyurea | JEFFAMINE T3000 | JEFFAMINE T403 |
| Crosslinker | CHDA Crude | Cyclohexane-carboxaldehyde |
| Crosslinker quantity (CHO to urea group) | 1:1 | 1:1 |
| PTSA catalyst (% solids) with 1 g IPA | 1 | 1 |
| Film Thickness (mil) | 1.3 | 2.7 |
| Pendulum Hardness (Konig, sec) | 51 | 59 |
| Pencil Hardness (gouge) | Fail | Fail |
| 20° Gloss (GU) | 105 | 109 |
| 60° Gloss (GU) | 109 | 110 |
| Cross-Hatch Adhesion | 0B | 5B |
| Impact Resistance (direct, in · lbs) | 100 | 50 |
| MEK Resistance (hammer, double rubs) | 12.5 | 10 |
| Gel Fraction (24 h, acetone) (%) | 35.5 | 2.5 |

We claim:

1. A non-aqueous crosslinkable composition comprising:
  a polyurea having a functionality of equal to or greater than 2;
  an aldehyde or acetal or hemiacetal thereof; and
  one or more organic solvents;
  wherein the aldehyde is a polyaldehyde,
  wherein the polyurea is polyetherurea,
  wherein the composition, prior to crosslinking, has an aldehyde group to urea group molar ratio from 2:1 to 0.5:1; and
  wherein the non-aqueous crosslinkable composition means a crosslinkable composition in which a polymer is not dispersed in a continuous aqueous phase.

2. The non-aqueous crosslinkable composition according to claim 1, wherein the polyaldehyde comprises one or more cyclic, nonaromatic polyaldehydes having from 3 to 20 ring carbon atoms.

3. The non-aqueous crosslinkable composition according to claim 2, wherein the polyaldehyde is cyclohexanedicarboxaldehyde.

4. The non-aqueous crosslinkable composition according to any one of the preceding claims, further comprising a curing inhibitor.

5. The non-aqueous crosslinkable composition according to claim 4, wherein the curing inhibitor is chosen from water, an alcohol or a mixture thereof in an amount from 0.5 wt % to 20 wt %, based on the total weight of solids in the composition.

6. The non-aqueous crosslinkable composition according to claim 1, further comprising an acid catalyst having a $pK_a$ of less than 7.

7. The crosslinkable composition according to claim 1, wherein the crosslinkable composition is capable of reacting to cure at a temperature of equal to or less than 80° C. to form a crosslinked composition.

8. The crosslinkable composition according to claim 1, wherein the composition further comprises one or more additives selected from the group consisting of rheology modifiers, wetting agents, leveling agents, flow additives, stabilizers, surfactants, pigments, dispersants, and waxes.

9. A crosslinked composition comprising the crosslinking product of the crosslinkable composition according to claim 1.

10. A coating comprising the crosslinked composition according to claim 9.

11. The coating according to claim 10, wherein the coating is a concrete coating, composite coating, wood coating or a metal coating.

12. An article comprising a substrate and one or more coatings according to claim 10 associated at least with one or more surface of said substrate.

13. A process for producing a crosslinkable composition comprising:
  selecting a polyurea having a functionality of at least 2;
  selecting an aldehyde or acetal or hemiacetal thereof; and
  optionally selecting one or more solvents;
  admixing the polyurea, aldehyde, and if present, the one or more solvents, thereby producing said crosslinkable composition;
  wherein the aldehyde is a polyaldehyde comprising one or more cyclic, nonaromatic polyaldehydes or one or more aromatic polyaldehydes, wherein the polyurea is polyetherurea,
wherein the composition, prior to crosslinking, has an aldehyde group to urea group molar ratio from 2:1 to 0.5:1 and
wherein the non-aqueous crosslinkable composition means a crosslinkable composition in which a polymer is not dispersed in a continuous aqueous phase.

14. The process for producing a crosslinkable composition according to claim 13, further comprising admixing an acid catalyst having a $pK_a$ of less than 7 with the polyurea, aldehyde and if present, the one or more solvents.

* * * * *